Figure 1:
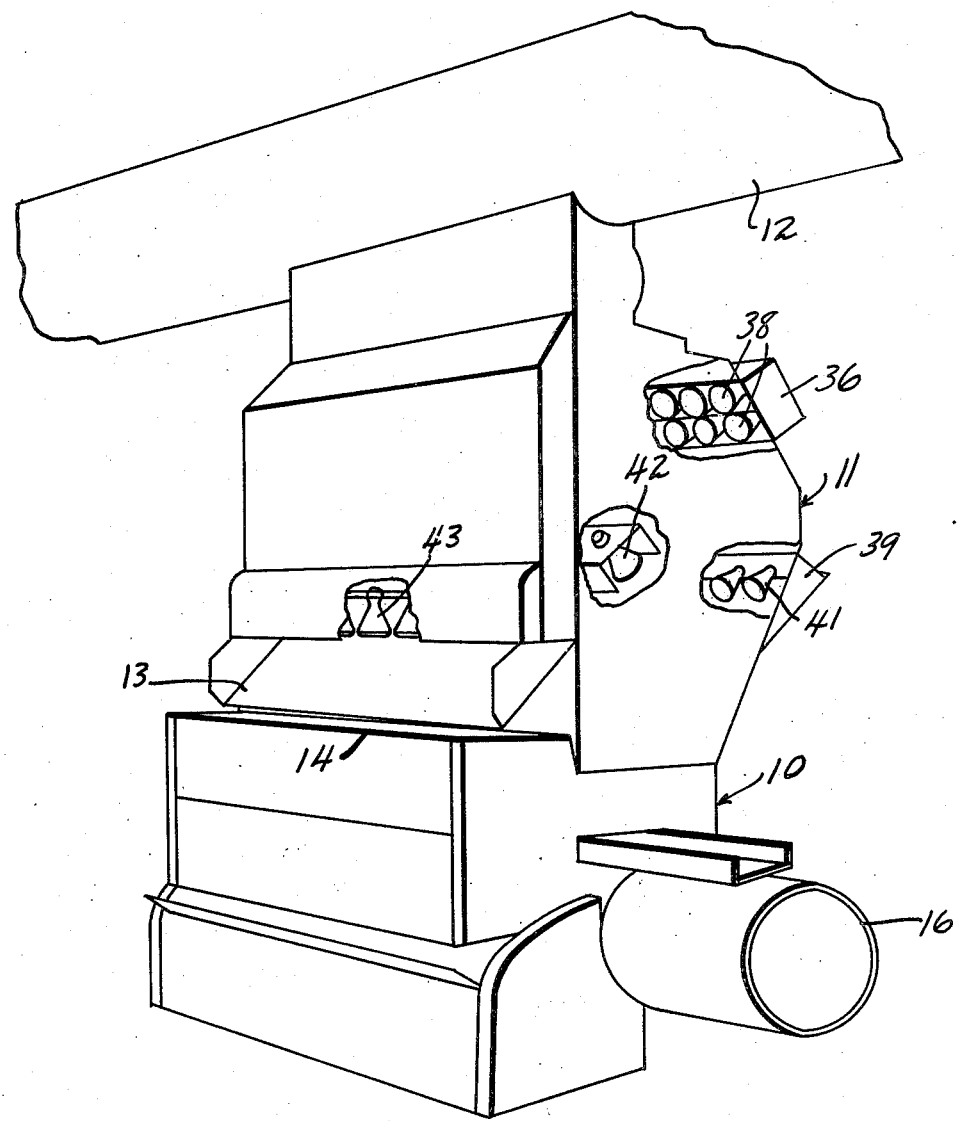

Oct. 10, 1950        S. A. BUCKMASTER        2,525,116
APPARATUS FOR CONDITIONING COTTON FOR GINNING

Filed June 19, 1947        2 Sheets-Sheet 1

INVENTOR
S. A. Buckmaster
By _Henry L. Jennings_
Attorney

Patented Oct. 10, 1950

2,525,116

UNITED STATES PATENT OFFICE 2,525,116

APPARATUS FOR CONDITIONING COTTON FOR GINNING

Samuel A. Buckmaster, Dallas, Tex., assignor to Lummus Cotton Gin Company, a corporation of Georgia Application June 19, 1947, Serial No. 755,805

4 Claims. (Cl. 19—67)

This invention relates to cotton treating apparatus and particularly to apparatus for cleaning and drying seed cotton in the process of ginning, and has for an object the provision of simple, economical apparatus of the character designated which shall include improved means for heating and driving the moist air out of the cotton.

A further object of my invention is the provision of heating means for cotton cleaning and ginning apparatus which shall be effective to heat and dry the cotton passing therethrough and to keep the apparatus warm for operation at its highest efficiency.

The ginning of seed cotton usually takes place in the fall of the year when the weather is cool and when frequent rains and heavy dews occur. The cotton is frequently so damp it is necessary to dry it in order to gin it efficiently and this is usually accomplished by means of heated air blown through the cotton while confined in a casing. The air passing through the cotton thus becomes saturated with moisture evaporated from the cotton. Inasmuch as air at 90° F., when saturated with moisture, contains more than three times as much moisture as saturated air at 55° F., it will be seen that if the cotton becomes cooled below the dew point of its accompanying saturated air, before entering the gin, the moisture re-condenses thereon and it again becomes damp and difficult to gin.

My invention accordingly contemplates the provision of means within a cotton cleaner, immediately in advance of the gin, for heating the cotton and maintaining the cleaning apparatus warm whereby the saturated heated air is separated from the cotton as it moves in the open from the cleaner into the breast of the gin. This is accomplished in accordance with my invention by means of radiant heat from banks of infra red lamps so disposed within the casing of the cleaner as to direct their rays into the stream of cotton moving therethrough. The infra red heat rays penetrate the stream of cotton, heating it and its accompanying air so that it is delivered into the gin in a dry, heated condition.

It is contemplated that my invention will be associated in a gin house as an adjunct to the usual drying and cleaning equipment, to afford the delivery of thoroughly dry cotton to the gin and to maintain the equipment at the temperature at which it operates most efficiently. I have found that by providing the heating means of my invention with the cotton feeding and cleaning equipment associated with a gin, a much more efficient and satisfactory operation is obtained.

Figure 2:
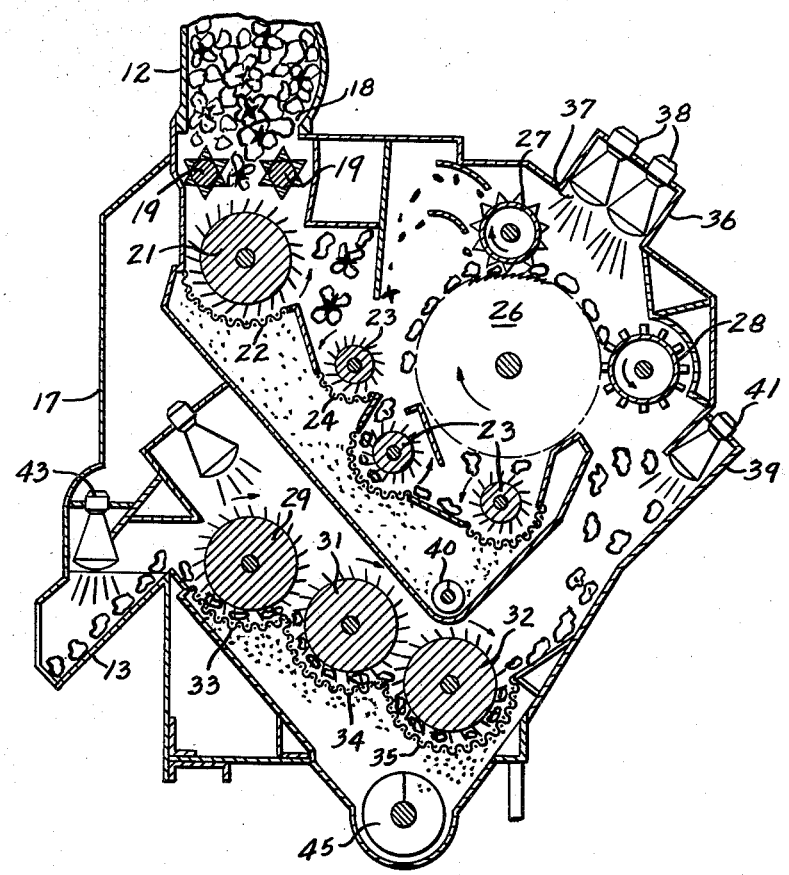

Apparatus embodying features of my invention is illustrated in the accompanying drawing forming a part of this application, in which Fig. 1 is a perspective view of a typical cotton gin having feeding and cleaning equipment mounted thereon, parts being broken away; and Fig. 2 is line sectional view of the feeding and cleaning apparatus with my improved heating means incorporated therein.

Referring now to the drawing for a better understanding of my invention, I show a cotton gin 10 having a combined feeding and cleaning apparatus 11 mounted thereon to which seed cotton is delivered from a distributor 12. Cotton, after passing through the apparatus 11, is discharged down a feed board 13 into the breast of the gin, indicated at 14, and is ginned. The ginned lint cotton passes from the gin through a lint flue 16, the ginned seeds falling out at the bottom of the gin from whence they are removed by conveying apparatus, not shown. The apparatus thus partly described is that in general use in gin houses. Also it is usual to employ a cotton dryer, not shown, ahead of the distributor 12, in which the cotton is dried usually by passing a current of heated air therethrough while in the dryer. This cotton, accompanied by heated, saturated air, passes into the distributor 12 from the dryer and, especially in cool weather, is often cooled below the dew point of the accompanying air, whereby moisture reforms on the cotton and it is delivered to the gin 10 in a damp condition.

In Fig. 2 of the drawing I show somewhat in detail the cleaning and feeding apparatus which comprises an outer casing 17 into which cotton is delivered from the distributor through an opening 18. The cotton is fed into the cleaner at a uniform rate by means of feed rolls 19 and is first engaged by a spiked feeder drum 21 rotating as indicated by the arrow, over a screen 22. After passing the screen 22, the cotton is engaged by small spiked rollers 23 rotating over screens 24 and is thrown by the rollers 23 against a saw cylinder 26. Coacting with the saw cylinder 26 is a huller roller 27, rotating as indicated in the drawing, which engages the hulls accompanying the cotton and breaks them for discharge through the screen. The cotton, stripped of its hulls, is doffed from the saw cylinder 26 by means of a doffer brush 28 and from thence passes downwardly where it is engaged by a series of spiked rollers 29, 31, and 32 which rotate as indicated by the arrows in the drawing over screens 33, 34, and 35 to remove the last of the dirt and trash from the cotton. The cotton then passes down the feed board 13 as previously described, into the gin 10. Foreign matter removed from the cotton is removed from the casing by means of screw conveyors 40 and 45.

In accordance with my invention, I provide within the casing 17, a plurality of banks or rows of infra red lamps which serve to maintain the cotton in a heated condition and to further separate the moisture therefrom in its passage through the cleaner. At 36 I show a rectangular housing which extends along at the rear of the casing over an opening 37 therein and in which are mounted two rows of infra red electric lamps 38 which are directed toward the cotton passing over the saw cylinder 26. At 39 I show another housing extending lengthwise of the casing 17, beneath the doffing brush 28, and which has mounted therein a single row of infra red lamps 41, the rays of which are directed toward the cotton stream moving downwardly from the doffing brush 28. At 42 I show another row of lamps, mounted within the casing 17 and having their rays directed downwardly toward the cleaning rollers 29, 31, and 32. Still another row of infra red lamps 43 is shown, mounted within the casing 17, and with the rays thereof directed downwardly onto the feed board 13. As the cotton leaves the casing 17 and passes into the open air on the feed board 13 in a heated condition with the rays of the row of lamps 43 directed upon it, the heated air accompanying the cotton immediately rises so that it is no longer accompanied by air saturated with moisture and recondensation on the fibers cannot occur.

The infra red lamps illustrated are of a well known type having reflectors incorporated therein so that the rays may be then directed and require no detailed description. It will also be understood that my invention is not limited to the particular type of cleaning and feeding equipment illustrated but that it may be incorporated in any such equipment usually employed in a gin house. In any such equipment the stream of cotton passing through the cleaner is subjected successively to the heat from rows of infra red lamps.

From the foregoing it will be apparent that I have devised an improved method and apparatus for treating cotton which is simple and economical of design, manufacture, and operation, and one which is effective to deliver cotton into a gin in condition for most efficient ginning.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a cotton feeder and cleaner embodying a casing, a saw cylinder in the casing, a plurality of screens in the casing with means to beat and agitate the cotton as it passes over the screens, a row of infra red lamps disposed over the saw cylinder in the upper part of the casing and having their rays directed downwardly toward the saw cylinder, a row of infra red lamps having their rays directed toward the cotton leaving the saw cylinder, other infra red lamps directed toward the cotton passing over the screens, means to discharge the cotton from the casing into the open air to separate accompanying saturated air therefrom, and a last row of infra red lamps having their rays directed onto the cotton being discharged.

2. In a seed cotton feeder and cleaner comprising a casing in which the cotton is subjected to successive beating and screening operations and having means to feed cotton in a uniform stream to the upper part of the casing, a plurality of rows of infra red lamps having their rays directed toward the cotton stream within the casing to heat and maintain the cotton at a temperature above the dew point of the surrounding atmosphere while in the cleaner, means to discharge the cotton from the cleaner through the open air into a gin, and a last row of infra red lamps having their rays directed onto the cotton while in the open air.

3. In a cotton gin assembly embodying a cotton gin, a seed cotton feeder and cleaner comprising a casing in which the cotton is subjected to successive heating and screening operations and is discharged from the cleaner into the gin, means to feed cotton in a uniform stream to the upper part of the casing, means to discharge the cotton into the gin through the open air from the lower part thereof, a plurality of rows of infra red heating lamps disposed within the casing and having their rays directed toward the stream of cotton at successively descending levels, and another row of infra red lamps directed onto the cotton while it is being discharged into the gin.

4. In a cotton gin assembly in which seed cotton is passed through drying and cleaning equipment in a continuously moving stream and is discharged therefrom into a cotton gin, means in the cleaner to heat the cotton to a temperature above the dew point of the air accompanying the cotton, an open air feed board for discharging the cotton from the cleaner into the gin to separate the heated air accompanying the cotton therefrom, and a row of infra red lamps having their rays directed onto the stream of cotton, while on the feed board to maintain the elevated temperature of the cotton while it enters the gin.

SAMUEL A. BUCKMASTER.

REFERENCES CITED

The following references are of record in the file of this patent:

UNITED STATES PATENTS

| Number | Name | Date |
|---|---|---|
| 1,672,274 | Noftzger | June 5, 1928 |
| 2,016,017 | Muirhead | Oct. 1, 1935 |
| 2,099,064 | Henry | Nov. 16, 1937 |
| 2,192,823 | Aycock | Mar. 5, 1940 |
| 2,355,670 | Naeher et al. | Aug. 15, 1944 |
| 2,406,494 | Ferris | Aug. 27, 1946 |

OTHER REFERENCES

Society of Dyers & Colorists, vol. 58, No. 1, page 10, Jan. 1942.